May 5, 1953   O. F. JORDAN   2,637,459
DOUBLE BOILER COOKING UTENSIL
Filed Dec. 4, 1950
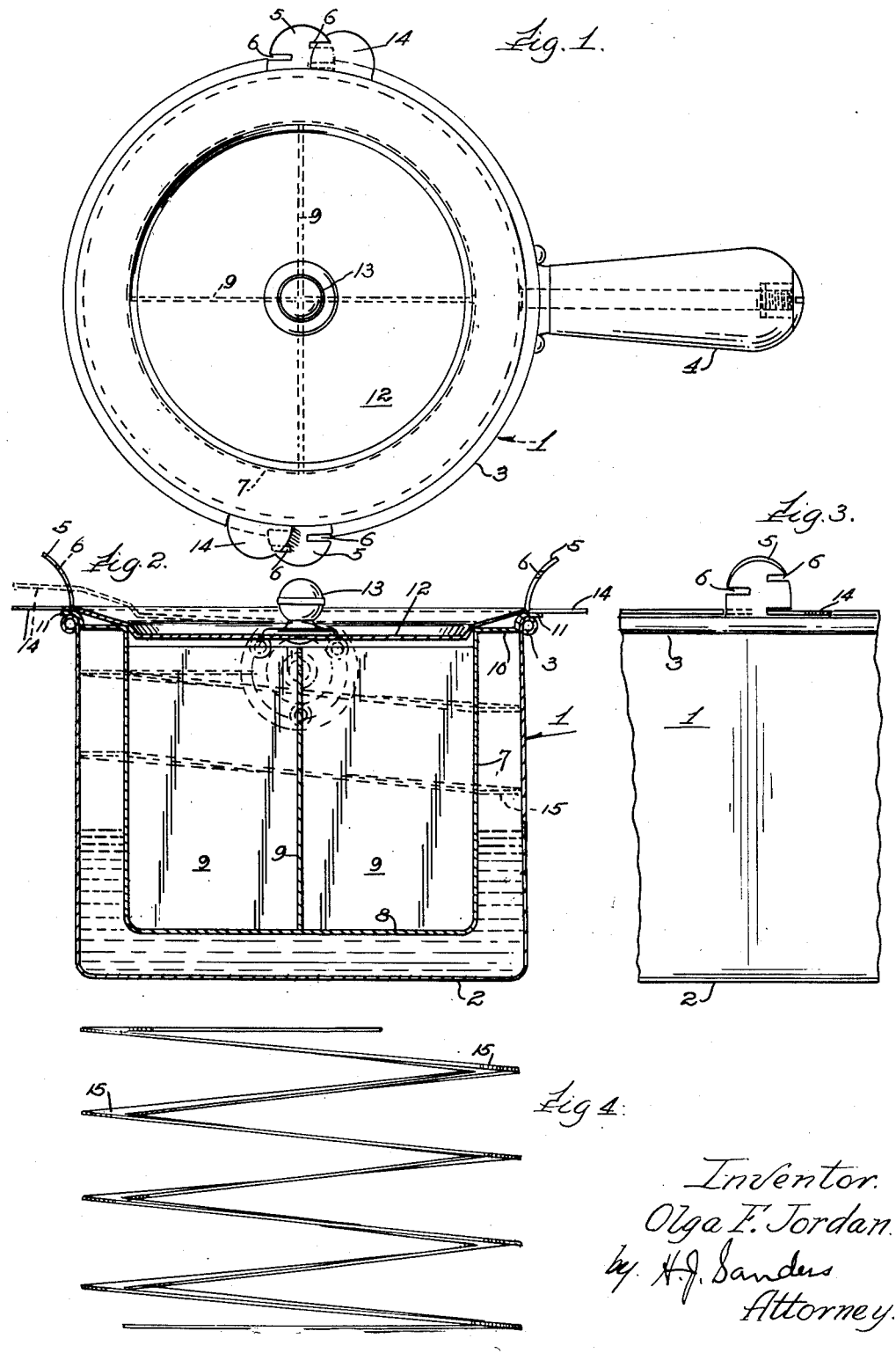
Inventor.
Olga F. Jordan.
by H. J. Sanders
Attorney.

Patented May 5, 1953

2,637,459

UNITED STATES PATENT OFFICE 2,637,459

DOUBLE BOILER COOKING UTENSIL

Olga F. Jordan, Chicago, Ill.

Application December 4, 1950, Serial No. 198,996

1 Claim. (Cl. 220—13)

This invention relates to cooking utensils and more particularly to a double boiler wherein several foods may be cooked at the same time and one wherein provision is made to control ebullient pressure of the cooking medium.

A further object is to provide a double boiler comprising few parts, that is inexpensive to manufacture, compact and durable in structure and efficient in use.

With the foregoing and other objects in view which will appear as the description proceeds, the invention resides in the combination and arrangement of parts and in the details of construction as hereinafter set forth and claimed, it being clearly understood that changes in the specific embodiment of the invention herein disclosed may be made within the scope of what is claimed, without departing from the spirit of the invention.

In the drawing, wherein like reference characters denote corresponding parts throughout:

Fig. 1 is a top plan view of a double boiler according to the instant invention.

Fig. 2 is a central vertical sectional view through Fig. 1 in a position at right angles thereto.

Fig. 3 is a fragmentary view of the outer member of the double boiler with an upstanding keeper carried thereby, and Fig. 4 is a view in elevation of a spacer track employed.

The reference numeral 1 denotes the outer container having a flat bottom 2, the body portion being circular in horizontal cross section, the rim 3 of the body being desirably rolled or rounded, the body being provided with the handle 4. Rising from the rim 3 and curved outwardly somewhat from each other are the oppositely disposed keepers 5, 5 each formed with staggered slots 6, 6.

Received in the container 1 is the concentric food container 7 having a flat bottom 8, the member 7 being circular in horizontal cross section and of materially less width and depth than the container 1, the food container 7 being provided with diametrical partitions 9, 9 disposed at right angles to each other and dividing the container into four equal food compartments, the space between the containers defining the compartment for the boiling liquid. The upper edge of the food container is bent to form a flat flange 10 extending to the wall of the container 1 and there bent or rounded thereover complementary to the rim 3 defining a lip 11 received upon said rim to support the food container.

Received upon the food container is the cover 12 having the handle 13, the cover being formed or provided with two oppositely disposed twin ears 14 for cooperation with the slots of the keepers 5, the ears being of such thickness as to permit either one of them to enter a slot 6 of a keeper 5 so that, as shown in broken lines in Fig. 2, the cover may be partially raised from the food container and there supported in tilted position to permit vapors from the cooking foods to escape into the atmosphere.

A desirably one-piece spiral track 15, preferably of metal strip, of uniform width throughout, the width of the strip being very slightly less than the space between the outer and inner containers, is disposed between said containers to keep them spaced apart an equal distance one from the other peripherally and to provide means to prevent boiling over of the cooking fluid.

What is claimed is:

In a double boiler, an outer container having a rounded rim, oppositely disposed keepers carried by said rim and extending upwardly and curved outwardly therefrom, oppositely disposed staggered slots formed in said keepers, an inner container received within said outer container and defining a liquid compartment therewith, a flange upon said inner container, the free edge of said flange rounded complementary to said rim for disposal thereupon, partitions in said inner container dividing same into compartments, a cover for said container adapted to rest upon said flange free edge, and oppositely disposed twin ears carried by said cover for disposal selectively in said keeper slots.

OLGA F. JORDAN.

References Cited in the file of this patent

UNITED STATES PATENTS

| Number | Name | Date |
|---|---|---|
| 982,848 | Niebling | Jan. 31, 1911 |
| 1,232,851 | Sayers | July 10, 1917 |
| 1,453,284 | Robe | May 1, 1923 |
| 1,619,573 | Haines | Mar. 1, 1927 |